(12) United States Patent
Richter et al.

(10) Patent No.: US 6,733,921 B2
(45) Date of Patent: May 11, 2004

(54) RECHARGEABLE ELECTRIC BATTERY

(75) Inventors: Gerolf Richter, Hildesheim (DE);
Peter Streuer, Hannover (DE); Oliver Bosch, Garbsen (DE)

(73) Assignee: VB Autobatterie GmbH (DE)

( * ) Notice: Subject to any disclaimer, the term of this patent is extended or adjusted under 35 U.S.C. 154(b) by 64 days.

(21) Appl. No.: 10/115,377

(22) Filed: Apr. 3, 2002

(65) Prior Publication Data

US 2002/0146622 A1 Oct. 10, 2002

(30) Foreign Application Priority Data

Apr. 7, 2001 (DE) .......................... 101 17 576

(51) Int. Cl.[7] .................. H01M 2/00; H01M 2/08; H01M 2/02; H01M 6/04
(52) U.S. Cl. ................ 429/180; 429/65; 429/181; 429/204
(58) Field of Search .............. 429/65, 178, 181, 429/180, 204, 163

(56) References Cited

U.S. PATENT DOCUMENTS

| | | | |
|---|---|---|---|
| 5,128,218 A | * | 7/1992 | Tokunaga et al. .............. 429/57 |
| 5,217,823 A | * | 6/1993 | Geibl et al. .................... 429/55 |
| 6,040,079 A | * | 3/2000 | Mcmurren .................... 429/91 |
| 6,071,642 A | * | 6/2000 | Pospiech et al. ............. 429/175 |

FOREIGN PATENT DOCUMENTS

| | | |
|---|---|---|
| DE | 42 32 961 A1 | 4/1994 |
| EP | 0 574 619 A1 | 12/1993 |

* cited by examiner

*Primary Examiner*—Thomas H. Parsons
(74) *Attorney, Agent, or Firm*—Foley & Lardner LLP

(57) ABSTRACT

A rechargeable electric battery including a plate block arranged in a plastic block box, positive and negative electrodes located in the box and electrically isolated by separators and conductively connected by sulfuric acid electrolyte, a cover for the box which has closure plugs and/or acid state indicators fitted in a gas-tight manner to openings therein, wherein at least a portion of an inner surface of the battery is electrically conductive or is provided with an electrically conductive layer, beginning in an area of a sealing seat of the closure plug or of the acid state indicator, and is electrically conductively connected to the electrolyte.

17 Claims, 2 Drawing Sheets

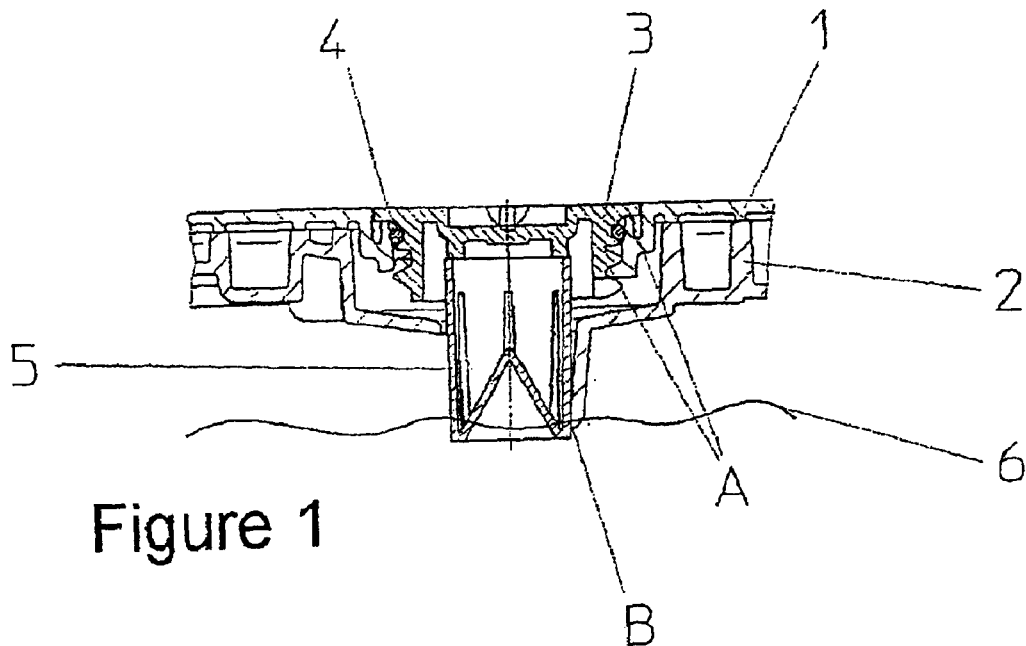
Figure 1
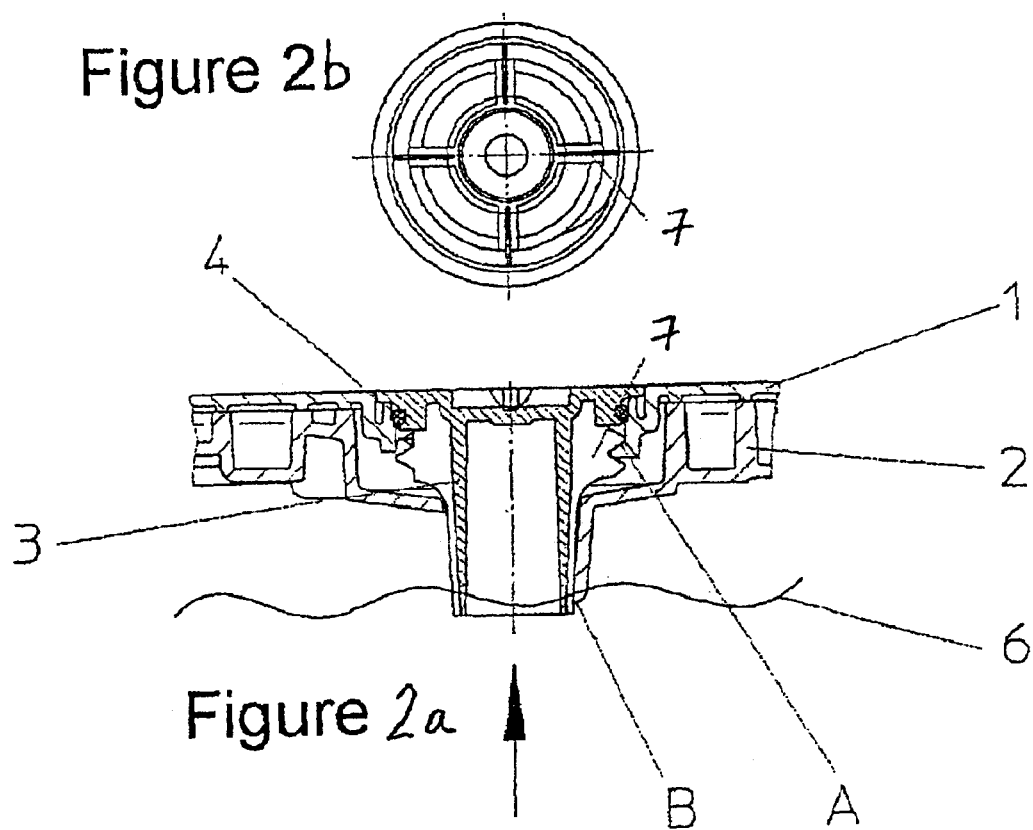
Figure 2b
Figure 2a

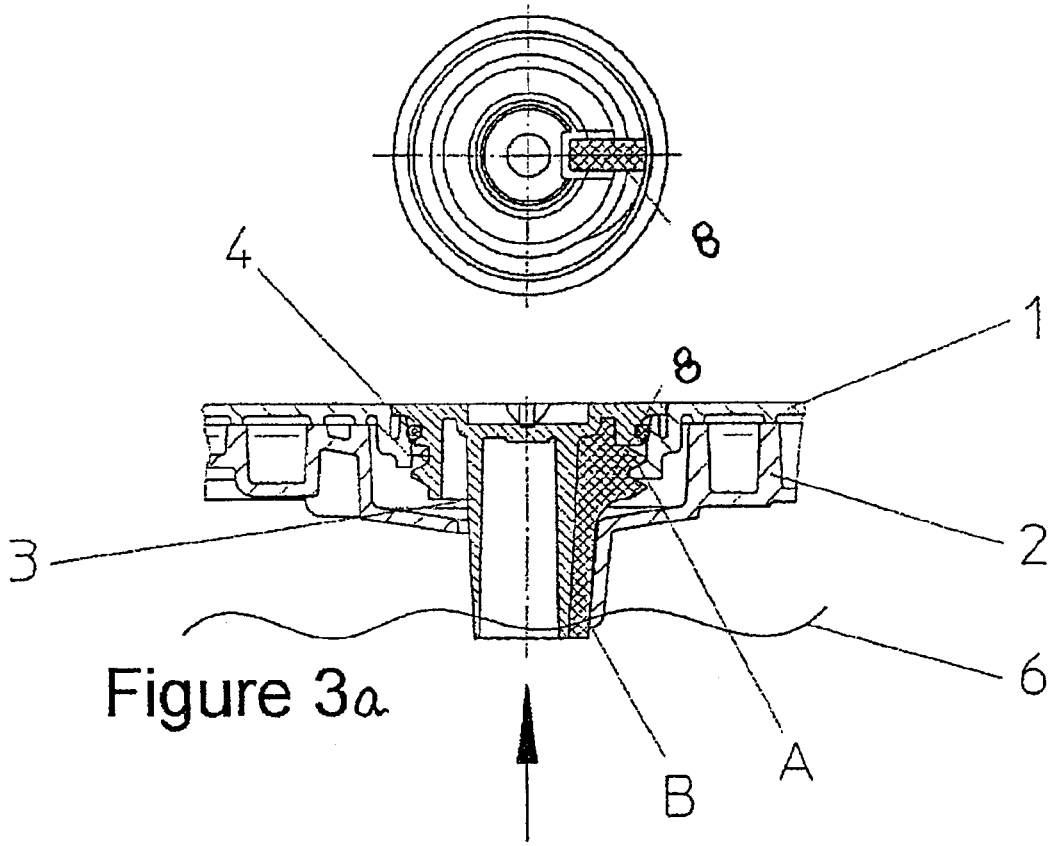
Figure 3b
Figure 3a
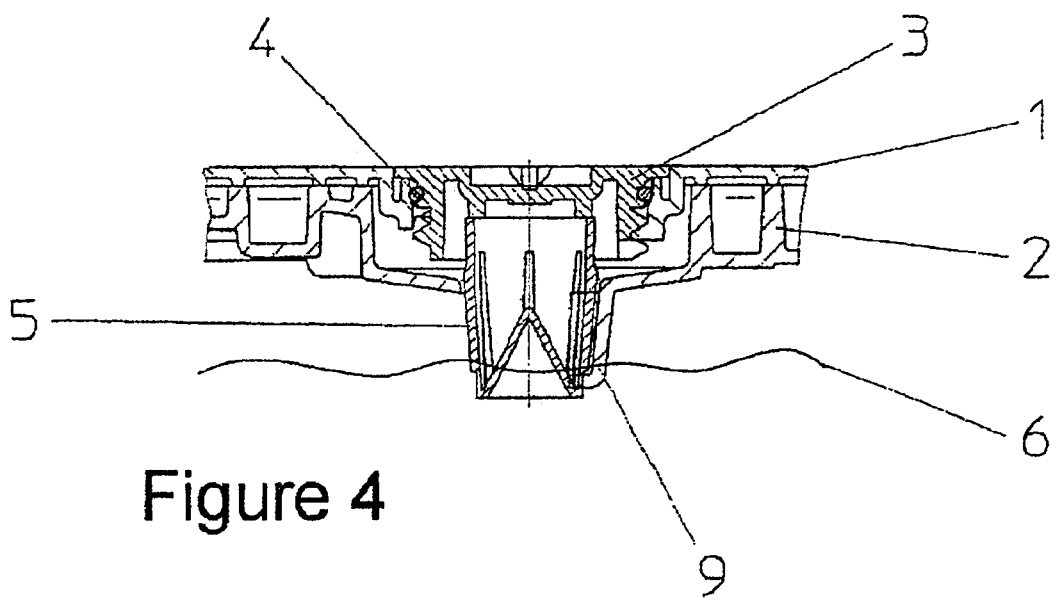
Figure 4

RECHARGEABLE ELECTRIC BATTERY

FIELD OF THE INVENTION

This invention relates to a rechargeable electric battery having a plate block arranged in a plastic block box and comprises positive and negative electrodes, which are electrically isolated by separators and are conductively connected by a sulfuric acid electrolyte, the box being closed off by a plastic cover which has closure plugs fitted in a gas-tight manner and/or acid level or acid density indicators fitted in a gas-tight manner. This invention also relates to closure plugs and acid level or acid density indicators suitable for such rechargeable batteries.

BACKGROUND

A mixture of hydrogen and oxygen, which react very easily, is produced during the charging of lead-acid batteries. Although ignition of this charging gas mixture very seldom occurs, as measured by the widespread and increasing number of these electrical storage devices, which are located almost exclusively in motor vehicle applications, methods of avoiding such ignition are continually sought. As a result of design improvements in such rechargeable batteries, the most frequent causes of charging gas ignition with consequential injury, such as recharging with devices external to the vehicle (31%), clamping or unclamping the battery cables (26%), starting-aid operations (19%) and refilling with distilled water, still only hide a very low risk of explosion.

The common factor in the above-mentioned ignition situations is in mishandling of the battery beforehand, which leads to formation of a spark with a sufficient energy content (>0.2 mJ), which then ignites the charging gas leaving the rechargeable battery and flashes back into the battery. The openings which come into question for the flashback are primarily the battery cell plugs provided with a small hole for the purpose of degassing and, in the case of specific designs with leakproof plugs, the common gas outlet from a plurality of cells, connected by a collecting line in the battery cover. Progress could be achieved by introducing antimony-free lead alloys for the current-carrying structural materials in batteries for the application in passenger cars, and the charging gas development, which has become considerably lower as a result, in conjunction with the use of battery covers with a gas collecting channel in front of whose opening, on the outside, there is a microporous molding (frit) which prevents a charging gas detonation flashing back into the battery. In parallel with this development, in rechargeable batteries of the above design, either gas-tight cell plugs are used or plugs and the associated opportunity for refilling with water are dispensed with entirely, if the antimony-free lead alloys already mentioned are use.

Thus, the risk of charging gas ignition from the interior of the rechargeable battery substantially still only comprises the following; in general brought about by the fracture of current-carrying structural materials which are not completely covered with battery acid. But here, too, in particular with regard to corrosion resistance and increase in mechanical strength, considerable success has been achieved. This is reinforced still further by the lower charging gas development and the resulting on average considerably higher level of acid.

Nevertheless, both in the case of passenger car batteries and, in particular in the case of utility vehicle batteries, in the manufacture of which antimony-alloyed lead is still used to a very great extent, charging gas ignitions still occur. Static electricity is regarded as the main cause in these cases which, to a very great extent, is produced by friction on the surface of the plastic battery housing.

On its route to the electrolyte or to the conductive structural material of the rechargeable battery, the charge of static electricity jumps over regions in the interior of the battery and, as a result of spark formation, leads to charging gas ignition. The latter is present more frequently in an ignitable concentration, in particular, in the case of the above-mentioned safety constructions having a frit element closure which, however, prevents the outflow of charging gas.

It is known to reduce the surface resistance of the block box cover by means of electrically conductive coatings or labels or by means of electrically conductive surface engraving (EP 841146 A1, EP 887870 A2) or to provide a Faraday cage by means of an electrically conductive covering of the battery with grounding to the vehicle ground (battery negative terminal) to avoid the build-up of static surface electricity.

It is also known to effect considerable attenuation of possible explosions, as far as their complete suppression by blocking up the cavities filled with gas. (EP 574619 A1, DE 42 32 961 A1).

However, it has been shown that even by means of these known measures, ignition of the charging gases cannot always be avoided. It would, therefore, be highly advantageous to provide a rechargeable battery of the type mentioned above in which ignition of charging gas in the interior of the battery caused by static electricity are avoided to the greatest possible extent.

SUMMARY OF THE INVENTION

The invention relates to a rechargeable electric battery including a plate block arranged in a plastic block box, positive and negative electrodes located in the box and electrically isolated by separators and conductively connected by sulfuric acid electrolyte, a cover for the box which has closure plugs and/or acid state indicators fitted in a gas-tight manner to openings therein, wherein at least a portion of an inner surface of the battery is electrically conductive or is provided with an electrically conductive layer, beginning in an area of a sealing seat of the closure plug or of the acid state indicator, and is electrically conductively connected to the electrolyte.

The invention also relates to a closure plug for a rechargeable battery having a plate block which is arranged in a plastic block box and comprises positive and negative electrodes isolated by separators and are conductively connected by a sulfuric acid electrolyte, including a closure plug body which is electrically conductive, at least at surface portions thereof, or is provided with an electrically conductive layer.

The invention further relates to an acid state indicator for a rechargeable battery having a plate block which is arranged in a plastic block box and comprises positive and negative electrodes isolated by separators and are conductively connected by a sulfuric acid electrolyte, including an acid state indicator which is electrically conductive, at least at surface portions thereof, or is provided with an electrically conductive layer.

BRIEF DESCRIPTION OF THE DRAWINGS

FIG. 1 is a cross-sectional view of a cover and plug of a battery in accordance with aspects of the invention.

FIG. 2a is a cross-sectional view of a cover and plug of a battery in accordance with aspects of the invention.

FIG. 2b is a bottom plan view of the plug of FIG. 2a.

FIG. 3a is a cross-sectional view of a cover and plug of a battery in accordance with aspects of the invention.

FIG. 3b is a bottom plan view of the plug of FIG. 3a.

FIG. 4 is a cross-sectional view of a cover and plug of a battery in accordance with aspects of the invention.

DETAILED DESCRIPTION

According to the invention, the intention is neither to prevent the production of static electricity nor to minimize the consequences of a charging gas ignition. Instead, care is taken that when the charge flows away, even through an opening in the battery closed in a gas-tight manner from the location at which the charge enters until it reaches the electrolyte level or the current-carrying structures, flashover in the gas space and the spark formation associated therewith is avoided. According to the invention, therefore, a short, adequately well-conducting path for static electricity is provided from the location of the entry into the interior of the battery as far as the electrolyte level or metal structures, or an internal spark arrester for static surface electricity to avoid production of ignition sparks.

This is because if static electricity builds up on the battery surface, with typical voltages in the range of a few kilovolts, it has been shown that there is also the possibility that this charge will pass through the seat of a gas-tight cell plug to the interior of the rechargeable battery, to be discharged via the electrically conductive electrolyte or to the vehicle ground (grounding), with the risk of spark formation.

The invention is based on the finding that the main inlet opening is the acid-wetted sealing seat of gas-tight and liquid-tight cell closure plugs. In addition to closure plugs, in the connection according to the invention, closure plugs which contain acid indicators (acid level and/or acid density) are also to be understood, as are acid state indicators, which are screwed or pressed into openings in the cover of the rechargeable battery in addition to closure plugs. These closure plugs and/or acid state indicators are, therefore, produced from sufficiently conductive material ($\leq 1 \cdot 10^5$ $\Omega$ cm), according to the invention, and/or their surface is configured in such a way that, beginning from the sealing seat, over the entire length of the plug, sufficient acid wetting is ensured as a result of surface roughness or capillary structures or as a result of areas with a low surface tension. Furthermore, these plugs either have direct electrical contact with the battery acid or, via the conductive contact with at least one other component in the interior of the battery, an overall electrically conductive connection from the possible point of entry of the static charge to the electrolyte is ensured.

According to the invention, at least the inner surface of the battery is electrically conductive or provided with an electrically conductive layer, beginning in the area of the sealing seat of the closure plug, and is electrically conductively connected to the electrolyte. The closure plug is made, for example, of electrically conductive material and is insulated on the area which belongs to the outer surface of the battery.

A plug according to the invention can be composed of, for example, corrosion resistant metal, conductive plastic, carbon (graphite, pyrolytic carbon), plastic doped with carbon powder or carbon fibers or conductive ceramic material.

It is also possible to use a closure plug made of plastic which has been coated with metal vapor, coated with conductive plastic, for example, in spray form, or whose surface has been made conductive by laser engraving or flame treatment.

Furthermore, it is possible to produce the conductivity by arranging capillaries between plug and cover, the capillaries being filled with acid during the operation of the rechargeable battery. A further possibility consists of the use of active capillary structural materials at least partly surrounding the plug, such as non-woven materials, which may also have an electrical conductivity, in particular, when they are impregnated with electrolyte.

The electrical connection between closure plug and acid is provided by immersing the lower part of the plug into the electrolyte or via parts of the rechargeable battery which provide an electrical connection to the acid, or via an active capillary wick which effects the connection to the electrolyte.

In the following text, the subject of the invention is explained in more detail by reference to FIGS. 1 to 4, which each show a section through the plug opening of a utility vehicle battery cover.

Turning now to the drawings generally and FIG. 1 in particular, a closure plug 3 with a seal 4 is inserted in a gas-tight manner into the cover comprising an upper cover 1 and a lower cover 2. The plug shown in FIG. 1 has a splash basket 5 which projects into the cell and prevents acid splashes entering the interior of the plug. Plug 3 and splash basket 5 are produced from electrically conductive material. The lower part of the closure plug projects into the electrolyte of the rechargeable battery, whose acid level is designated by 6. Contact between upper cover 1 and plug 3 is made in the area A, contact between lower cover 2 and splash basket 5 is made in area B.

According to FIGS. 2a and 2b (FIG. 2a shows the closure plug from below), the closure plug is provided with a capillary gap 7 and, according to FIGS. 3a and 3b, a non-woven material 8 is located in the closure plug, is an active capillary and, therefore, provides the electrical contact between electrolyte 6 and rechargeable battery covers 1 and 2. Contact between upper cover 1 and plug 3 is made in area A, contact between lower cover 2 and plug 3 is made in area B.

In FIG. 4, an active capillary gap 9 is provided between lower cover 2 and splash basket 5. Gap 9 fills with electrolyte and produces an electrical connection between electrolyte 6 and rechargeable battery covers 1 and 2. Contact between upper cover 1 and plug 3 is made in area A, contact between lower cover 2 and splash basket 5 is made in area B.

As a result of the configurations of closure plugs according to the invention, the ignition of charging gases caused by electrostatic charging on the surface of the cover is reliably avoided and without great expenditure.

What is claimed is:

1. A rechargeable electric battery comprising: a plate block arranged in a plastic block box; positive and negative electrodes located in the box and electrically isolated by separators and conductively connected by sulfuric acid electrolyte; a cover for the box which has closure plugs and/or acid state indicators fitted in a gas-tight manner to openings therein, wherein at least a portion of an inner surface of the battery is electrically conductive or is provided with an electrically conductive layer, beginning in an area of a sealing seat of the closure plug or of the acid state indicator, and is electrically conductively connected to the electrolyte.

2. The rechargeable electric battery as claimed in claim 1, wherein the closure plug is composed of electrically conductive plastic.

3. The rechargeable electric battery as claimed in claim 2, wherein the closure plug is insulated on an area of an outer surface of the battery.

4. The rechargeable electric battery as claimed in claim 1, further comprising active capillary structures and/or areas with a low surface tension, which maintain a conductive acid film, arranged in the closure plug and/or between the closure plug and the cover.

5. The rechargeable electric battery as claimed in claim 1, wherein a surface of the closure plug is at least partly provided with a non-woven material with active capillary properties.

6. The rechargeable electric battery as claimed in claim 1, wherein a lower portion of the closure plug projects into the electrolyte.

7. The rechargeable electric battery as claimed in claim 1, wherein the closure plug is electrically connected to the electrolyte via a wick-like active capillary non-woven material.

8. A closure plug for a rechargeable battery having a plate block which is arranged in a plastic block box and comprises positive and negative electrodes isolated by separators and are conductively connected by a sulfuric acid electrolyte, comprising a closure plug body which is electrically conductive, at least at surface portions thereof, or is provided with an electrically conductive layer.

9. The closure plug as claimed in claim 8, wherein the body is composed of electrically conductive plastic.

10. The closure plug as claimed in claim 9, wherein the body is insulated on an area of an outer surface of the battery.

11. The closure plug as claimed in claim 8, further comprising an active capillary structure.

12. The closure plug as claimed in claim 8, further comprising an active capillary nonwoven material providing electrical contact with the electrolyte.

13. An acid state indicator for a rechargeable battery having a plate block which is arranged in a plastic block box and comprises positive and negative electrodes isolated by separators and are conductively connected by a sulfuric acid electrolyte, comprising an acid state indicator body which is provided with a surface for dissipating static electricity.

14. An acid state indicator for a rechargeable battery having a plate block which is arranged in a plastic block box and comprises positive and negative electrodes isolated by separators and are conductively connected by a sulfuric acid electrolyte, comprising an acid state indicator body which is electrically conductive, at least at surface portions thereof, or is provided with an electrically conductive layer: wherein the body is composed of electrically conductive plastic.

15. The acid state indicator as claimed in claim 14, wherein the body is insulated on an area of an outer surface of the battery.

16. An acid state indicator for a rechargeable battery having a plate block which is arranged in a plastic block box and comprises positive and negative electrodes isolated by separators and are conductively connected by a sulfuric acid electrolyte, comprising an acid state indicator body which is electrically conductive, at least at surface portions thereof, or is provided with an electrically conductive layer; further comprising an active capillary structure.

17. An acid state indicator for a rechargeable battery having a plate block which is arranged in a plastic block box and comprises positive and negative electrodes isolated by separators and are conductively connected by a sulfuric acid electrolyte, comprising an acid state indicator body which is electrically conductive, at least at surface portions thereof, or is provided with an electrically conductive layer; further comprising an active capillary nonwoven material providing electrical contact with the electrolyte.

\* \* \* \* \*